United States Patent [19]

Goodman

[11] Patent Number: 4,459,943
[45] Date of Patent: Jul. 17, 1984

[54] FLUID INJECTION SYSTEM FOR AN INTERNAL COMBUSTION ENGINE RESPONSIVE TO FUEL FLOW

[75] Inventor: Toronta P. Goodman, Summit Point, W. Va.

[73] Assignee: Goodman System Company, Inc., Armonk, N.Y.

[21] Appl. No.: 333,449

[22] Filed: Dec. 22, 1981

[51] Int. Cl.³ .......................................... F02M 25/04
[52] U.S. Cl. ................. 123/25 J; 123/25 K; 123/25 N; 123/25 A
[58] Field of Search ............... 123/25 J, 25 K, 25 L, 123/25 M, 25 N, 25 R, 25 A

[56] References Cited

U.S. PATENT DOCUMENTS

| | | |
|---|---|---|
| 3,575,145 | 4/1971 | Steiger . |
| 3,631,843 | 1/1972 | Yeiser ................... 123/25 L |
| 3,710,771 | 1/1973 | Cinquegrani . |
| 3,867,918 | 2/1975 | Williams et al. . |
| 3,911,871 | 10/1975 | Williams et al. ........ 123/25 K |
| 3,930,470 | 1/1976 | Douglas ................ 123/25 A |
| 3,933,135 | 1/1976 | Zillman . |
| 4,027,630 | 6/1977 | Giardini ................ 123/25 N |
| 4,031,864 | 6/1977 | Crothers ............... 123/25 A |
| 4,043,300 | 8/1977 | Lombard . |
| 4,096,829 | 6/1978 | Spears ................... 123/25 L |
| 4,109,669 | 8/1978 | Rivere . |
| 4,191,134 | 4/1980 | Goodman . |
| 4,231,333 | 11/1980 | Thatchen et al. ....... 123/25 R |
| 4,300,483 | 11/1981 | Goodman .............. 123/25 J |
| 4,300,484 | 11/1981 | Goodman .............. 123/25 J |
| 4,300,485 | 11/1981 | Goodman .............. 123/25 J |
| 4,368,711 | 1/1983 | Allen ................... 123/25 J |

Primary Examiner—Ira S. Lazarus
Attorney, Agent, or Firm—Warren B. Kice

[57] ABSTRACT

A fluid injection system for an internal combustion engine, including both spark-ignition and compression-ignition engines, includes a nozzle for injecting a finely divided spray of fluid, such as water, a water solution, or other combustion enhancing fluid, into the intake air of the engine in response to a flow of atomizing air. The nozzle is connected to a fluid supply and to the outlet an air injection pump that is connected to an electric drive motor. The drive motor is controlled by an electronic control circuit to provide the atomizing air to the nozzle in response to the fuel flow to the engine and in response to one or more engine parameters including parameters provided by a temperature sensor, a throttle position sensor, and/or a detonation sensor.

13 Claims, 11 Drawing Figures

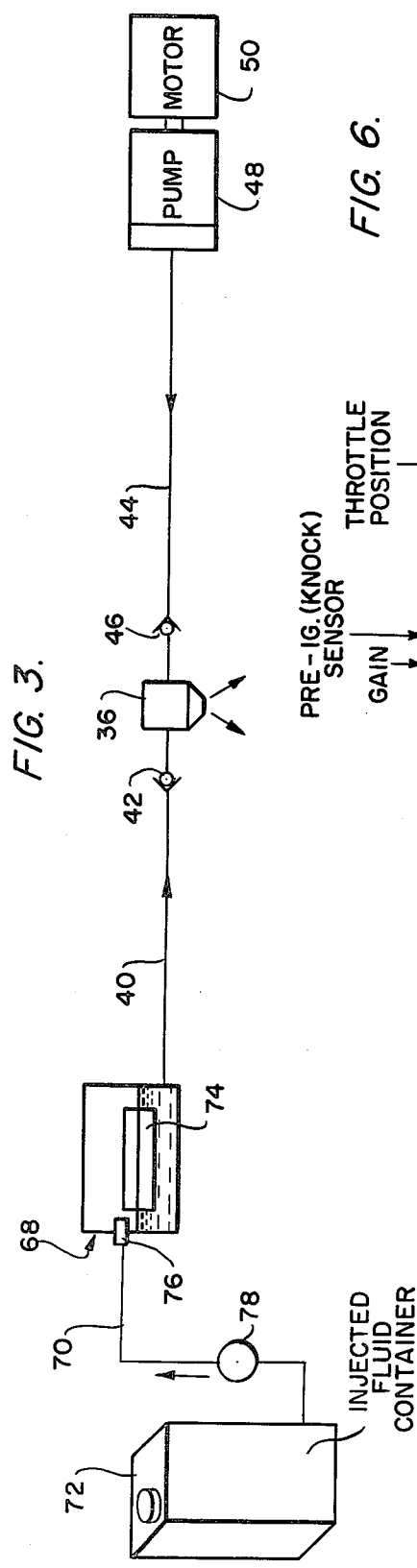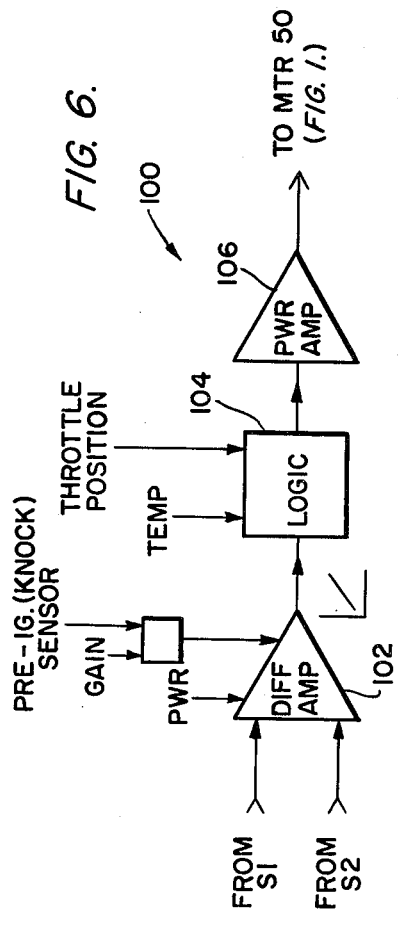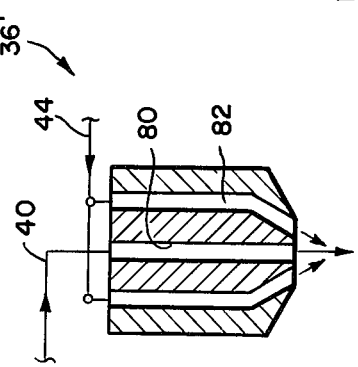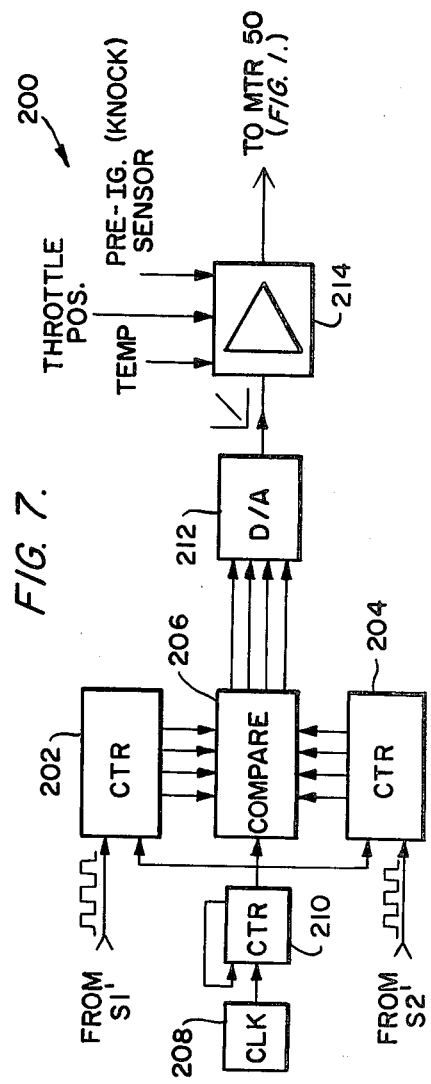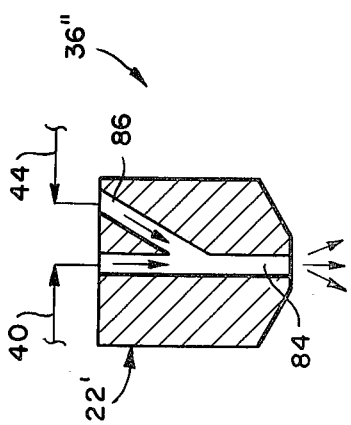

FLUID INJECTION SYSTEM FOR AN INTERNAL COMBUSTION ENGINE RESPONSIVE TO FUEL FLOW

BACKGROUND OF THE INVENTION

The present invention relates to a system for injecting a fluid, such as water, a water solution, or other combustion enhancing fluid, into the intake air of an internal combustion engine and, more particularly, to a fluid injection system and method for injecting fluid into an internal combustion engine, including both spark-ignition engines and compression-ignition engines, in which the fluid injection rate is responsive to engine fuel consumption.

Various fluids, such as water and water in solution with other substances including methanol or other alcohols, have been commonly injected into hydrocarbon engines, both of the spark-ignition and the compression-ignition type, to provide improved engine operation. During the compression stroke of the engine, the water droplets vaporize and absorb heat energy produced within the combustion chamber to thereby prevent pre-ignition. During the subsequent power stroke, the fuel/air charge is burned at a more even rate and any residual water is converted to steam to thereby moderate both the average and peak combustion chamber temperatures. As the residual droplets undergo conversion to steam, the water molecules undergo considerable volumetric expansion which enhances combustion chamber pressures and, accordingly, provides higher power stroke forces. The presence of the steam also tends to remove and prevent formation of carbonaceous deposits on the combustion chamber surfaces. As as result of the beneficial effects of fluid injection, the engine is able to run more smoothly and efficiently and with greater operating life since the pistons and valves are not exposed to high peak combustion chamber temperatures or the detrimental effects of pre-ignition or detonation. Also, the moderation of the peak combustion chamber temperature greatly reduces the undesirable formation of the oxides of nitrogen ($NO_x$). Fluid injection is particularly advantageous with respect to combustion-ignition engines, since the fluid injection appears to moderate the amplitude of the otherwise substantial low frequency vibrations characteristic of these engines.

Various types of prior art devices have been developed to introduce fluids into the intake air of internal combustion engines. These devices have included nozzle-type injectors in which the fluid is pumped directly into the engine and intake air humidifiers in which air is passed through a volume of water before being introduced into the engine. Direct injection of the fluid into the intake air has certain drawbacks since it is difficult to precisely meter a relatively small volume of a fluid to obtain an optimum volumetric ratio of injected fluid to the final fuel/air charge. If humidified air is used, much less heat absorption is obtained when compared to water droplet injection, since the cooling effect obtained from the vaporization of discrete droplets is not present and the humidified air contains less water molecules per unit volume than relatively dry air having dispersed water droplets therein. In addition, it is very difficult to rapidly and precisely control humidification to achieve a selected humidity.

While these prior art devices have generally provided some engine performance improvement, they have operated in a manner not totally responsive to engine requirements. Thus, in some prior systems, the fluid injection rate may be adequate under certain engine operating conditions, such as the constant-speed cruise condition, while the injection rate during other operating conditions, such as acceleration and de-acceleration, may be too little or too much. When the fluid injection rate is insufficient, the beneficial effects of the fluid injection are, of course, not obtained. Conversely, when the fluid injection rate is too high, the surplus fluid within the combustion chamber tends to quench the combustion process and, of course, diminish engine performance.

SUMMARY OF THE INVENTION

It is therefore an object of the present invention to provide a system for injecting a fluid, such as water, a water solution, or other combustion enhancing fluid, into the intake air side of an internal combustion engine in response to engine operating parameters to improve engine operation.

It is another object of the present invention to provide a fluid injection system and method in which fluid is injected into the engine in response to engine load.

It is also another object of the present invention to provide a system and method for injecting a fluid, such as water, or a water solution, into the intake air side of an internal combustion engine at a rate which is at least responsive to engine fuel consumption.

It is still another object of the present invention to provide a fluid injection system and method of the above type in which the injection is achieved by controlling the flow of atomizing air through a jet nozzle in response to fuel consumption.

It is still another object of the present invention to provide a fluid injection system and method of the above type in which the injection occurs only at optimum times and at optimum rates determined by the operating states of the engine.

It is another object of the present invention to provide a fluid injection system of the above-type which is inexpensive to manufacture and which is simple and reliable in operation.

It is still a further object of the present invention to provide a fluid injection system of the above-type which is simple to install on internal combustion engines, either of the spark-ignition or the compression-ignition type, and which is ideally suited for both original equipment and after-market installations on motor vehicles.

In accordance with these objects and others, the present invention provides an injection system for injecting a combustion enhancing fluid, such as water or a water solution, into the intake air of an internal combustion engine, including both spark-ignition and compression-ignition engines. In a preferred form, a fluid injecting device, such as a jet nozzle, is located on the air intake side of an engine to introduce fluid in finely divided form into the intake air of the engine. The nozzle is connected to both a supply of the fluid to be injected and to a source of atomizing air that draws the fluid through the nozzle and into the air intake of the engine. The atomizing air is supplied from the outlet of a motor-driven air injection pump with the electric motor connected to an electronic control circuit. The electronic control circuit receives electrical signals from various sensors related to engine operating states including specific fuel consumption. In response to these electrical signals, the electric motor is controlled to vary the air flow rate through the nozzle and, accordingly, the injection rate of the fluid in a manner that is at least responsive to engine fuel consumption.

BRIEF DESCRIPTION OF THE DRAWINGS

The above description as well as further objects, features, and advantages of the present invention will be more fully understood by reference to the following description of a presently preferred but nonetheless illustrative embodiment when taken in conjunction with the accompanying drawings wherein:

FIG. 3 is a schematic representation of the fluid injection system of the present invention;

FIGS. 4 and 5 are cross sectional views of two exemplary fluid injection nozzles suitable for use with the present invention;

FIG. 6 is a schematic block diagram of an analog electronic control circuit that cooperates with the sensors of FIGS. 2 and 2A; and FIG. 7 is a schematic block diagram of a digital embodiment of an electronic control circuit that cooperates with the sensor of FIGS. 2 and 2B.

DESCRIPTION OF THE PREFERRED EMBODIMENT

Figure 1:
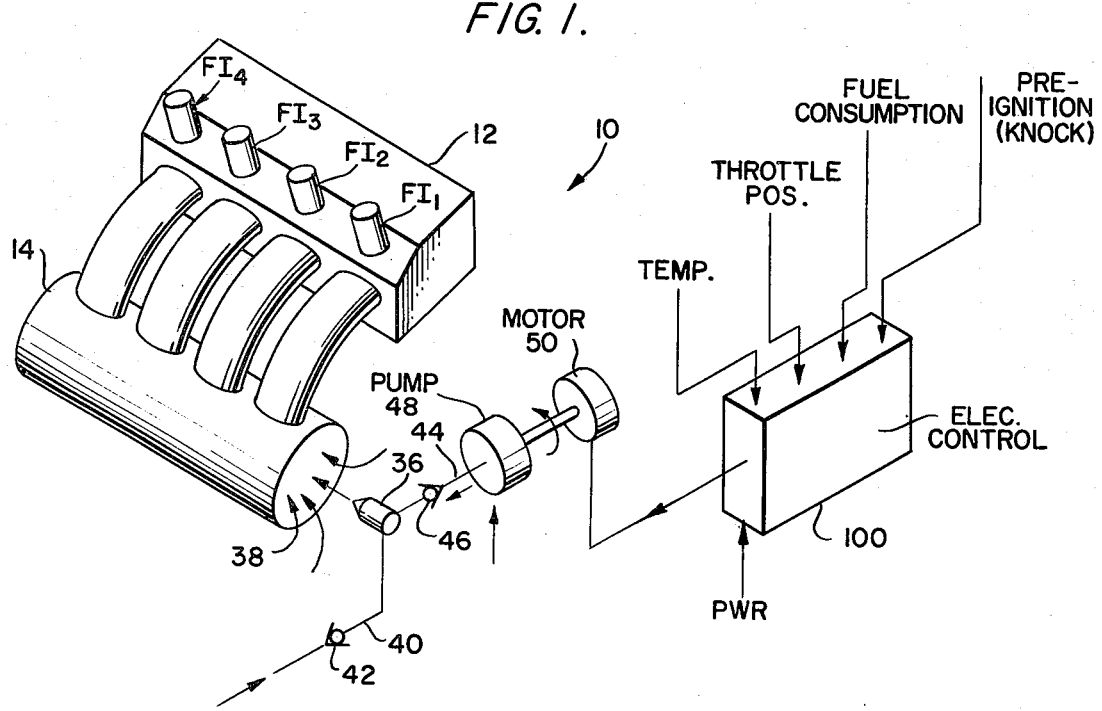
FIG. 1 is a perspective view, in schematic form, of the head assembly of an exemplary internal combustion engine equipped with a fluid injection system of the present invention with selected parts of the engine having been omitted for reasons of clarity.

FIG. 1 illustrates an exemplary head assembly, generally designated by the reference character 10, for an internal combustion engine suitable for use with the fluid injection system of the present invention. The head assembly 10 is representative of head assemblies suitable for use, as explained more fully below, with spark-ignition engines and combustion-ignition engines. The head assembly 10 is of the in-line type and includes a head 12 having the usual arrangement of combustion chambers and valves (not shown), an intake manifold 14 of the ram induction type, and four fuel injection stations $FI_1$, $FI_2$, $FI_3$, and $FI_4$ each adapted to receive a fuel injector (not shown). The remaining portions of the engine structure, including the block, the crankcase, and all ancilliary structures for effecting operation are known in the art and are omitted here for reasons of clarity.

When the exemplary head assembly 10 is part of a spark-ignition engine, the fuel injection stations $FI_1$...$FI_4$ are typically positioned upstream of the intake valve and include electrically actuated fuel injectors (not shown) that inject fuel into the combustion chamber through the opened intake valve port in response to electric control pulses provided by an electronic control unit (not shown). Typically, the fuel injectors are connected to a fuel distribution system of the type illustrated in FIG. 1A and generally designated therein by the reference character 16. The fuel distribution system 16 includes a fuel distribution loop 18 that receives fuel from the output of the vehicle fuel pump (not shown) through a fuel delivery line 20 with the fuel pressure being maintained by a pressure regulator 22 that returns excess fuel to the vehicle fuel tank through a return line 24 with the actual quantity or return rate of the fuel through the line 24 being dependent upon the fuel consumed by the engine. Four fuel injection lines $FI'_1$...$FI'_4$ are provided from the pressurized fuel distribution loop 18 to respective fuel injectors at the fuel injector stations $FI_1$...$FI_4$ illustrated in FIG. 1. In accordance with the present invention and as explained more fully below, a fuel flow sensor S1 is provided in the fuel delivery line 20 for measuring the fuel flow delivered to the fuel distribution loop 18 and another fuel flow sensor S2 is provided in the fuel return line 24 to measure the fuel flow returned to the vehicle fuel tank. Both sensors S1 and S2 are of the type that provide an electrical output representative of the fuel flow therethrough.

When the head assembly 10 illustrated in FIG. 1 is used in a combustion-ignition engine, the fuel injection stations $FI_1$...$FI_4$ are typically positioned for the direct injection of the fuel into the combustion chamber or into a pre-combustion chamber or swirl chamber adjacent to and in communication with the combustion chamber. The fuel injectors used are typically fuel pressure responsive and are connected to and cooperate with a fuel distribution system of the type schematically shown in FIG. 1B and represented by the reference character 26. A fuel injection pump 28, typically mechanically driven from the engine, receives fuel through a fuel delivery line 30, regulates the fuel pressure, and returns excess fuel to the vehicle fuel tank through a return line 32. The fuel injectors installed at the fuel injection stations $FI_1$...$FI_4$ illustrated in FIG. 1 are connected to the fuel injection pump 28 through suitable fuel carrying lines with the fuel injection rate and timing controlled by selected operation of the fuel pump rack 34. As in the case of the fuel distribution system 16 for the spark-ignition engine shown in FIG. 1A, the fuel distribution system 26 for the compression-ignition engine in FIG. 1B includes a fuel flow sensor S1' in the fuel delivery line 30 and another fuel flow sensor S2' in the fuel return line, with these sensors providing electrical outputs representative of the flow rates therethrough.

The fluid injection system of the present invention, as shown in FIG. 1, includes a nozzle 36 that is positioned in the intake air stream of the engine, for example, at the opening 38 of the manifold 14. The nozzle 36 is adapted to inject a finely divided diverging stream of a combustion enhancing fluid, such as water or a water solution, into the intake air of the engine. The nozzle 36 is connected to a source of fluid through a fluid supply line 40 that includes a check valve 42 and to a source of atomizing air through an air supply line 44 that also includes a check valve 46. The supply of atomizing air is provided from the output of an air pump 48, for example, a rotary vane air pump of the type disclosed in U.S. Pat. No. 4,300,485 issued Nov. 17, 1981 to the present applicant, the disclosure of which is incorporated herein. The air pump 48 is connected through a mechanical coupling to and is driven by an electric motor 50. An electronic control circuit 100, described more fully below in connection with FIGS. 7 and 8, is connected to and provides driving electric power for the motor 50. The electronic control circuit 100 receives fuel consumption input information from the sensors S1 and S2 and, if preferred, other engine related parameters including inputs from an engine temperature sensor, a throttle position sensor, and a pre-ignition or knock sensor.

Figure 1A:
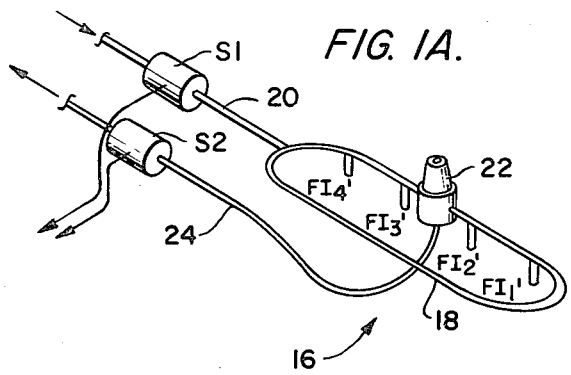
FIG. 1A is a perspective view of a fuel distribution and injection arrangement for a spark-ignition system suitable for use with the head assembly illustrated in FIG. 1.
Figure 1B:
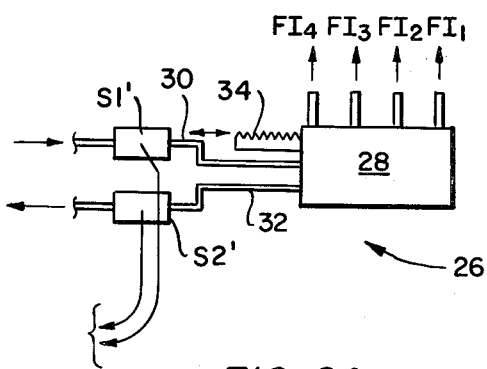
FIG. 1B is a perspective view of a fuel distribution and injection arrangement for a combustion-ignition engine suitable for use with the head assembly illustrated in FIG. 1.
Figure 2:
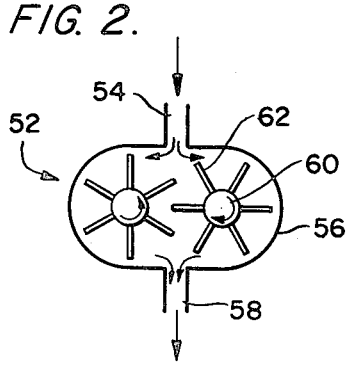
FIG. 2 is a cross sectional view of a suitable fuel flow sensor, for use with the arrangement of FIGS. 1A and 1B, of the type having adjacent rotatably mounted turbine like wheels with inter-engaging vanes.
Figure 2A:
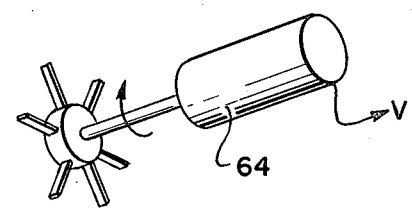
FIG. 2A is a partial perspective view of an analog signal generator having a tach generator connected to one of the turbine wheels shown in FIG. 2 to provide an electrical output proportional to the rotation of the turbine wheels.
Figure 2B:
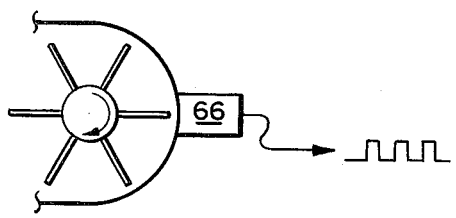
FIG. 2B is a perspective sectional view of a digital signal generator in which a pick-off is positioned on the fuel flow sensor housing of FIG. 2 to provide a pulse output with the passage of each vane past the sensor.

The fuel flow sensors S1 and S2 shown in FIGS. 1A and 1B can be of any suitable type that provides an electrical output proportional to the fuel flow rate therethrough. A suitable fuel flow sensor 52 is shown in cross section in FIG. 2 and includes an inlet 54, a main body 56, an outlet 58, and two rotatably mounted flow responsive turbine-like wheels 60, each of which is provided with radially outward extending vanes 62 which inter-leave with the vanes 62 on the oposite wheel 60. As the fuel flows through the fluid flow sensors S1 and/or S2, the turbine wheels 60 rotate at a rotational speed that is directly proportional to the flow rate through the sensor. An electrical output, either an analog or a digital output, proportional to the fluid flow rate through the sensor can be obtained as shown, for example, in FIGS. 2A and 2B. In FIG. 2A, one of the turbine 60 is coupled through a suitable shaft arrangement to a tach-generator 64 that provides an analog DC output that is proportional to the rotational speed of the connected turbine wheel 60. In FIG. 2B, a pick-off 66, such as a magnetic or Hall effect pick-off, is mounted on the main body 56 of the sensor and is adapted to provide an electrical output in pulse form each time one of the vanes 62 passes the pick-off. For this purpose, the vanes 62 are fabricated from a material that will cause the pick-off to provide the desired pulse output. The pick-off 66, accordingly, provides a serial pulse output, the pulse repetition rate of which varies in a manner proportional to fuel flow. Other pick-off schemes are also suitable including, for example, photo-electric pick-offs in which the vanes 62 interrupt a light beam to provide the desired serial pulse output. The described fuel flow sensors are exemplary; other types of fuel flow sensors are suitable, as long as an electrical output proportional to flow is provided. Other suitable flow sensors include the hot wire type and the displaced float type. A more detailed view of a fluid injection system and nozzle arrangement according to the present invention may be had by reference to FIGS. 3, 4, and 5.

As shown in FIG. 3, the supply hose 40 is connected between the nozzle 36 and a float-bowl reservoir 68 which, in turn, is connected through a hose 70 to a fluid container 72. The float bowl reservoir 68 includes a float 74 that is connected to or otherwise cooperates with an inlet valve 76, such as a needle valve, to maintain a uniform level of injected fluid within the reservoir 68 in a known manner. In a preferred embodiment, the fluid to be injected is in the form of water, or water in solution with other substances such as methanol or other alcohols, and the container 72 is provided with a pump 78 for pumping the fluid from the container 72 to the reservoir 68. The float 74 is preferably located at a selected elevation below the elevation of the nozzle 36 to prevent the fluid from unintentionally flowing under the influence of gravity to and through the nozzle 36. The reservoir 68, while not necessary to the operation of the system of the present invention, permits the supply container 72 to be located remotely from the engine at a convenient elevation relative to the nozzle 36.

The nozzle 36 is adapted to provide a preferably diverging flow of dispersed finely divided fluid droplets in response to the flow of air through the nozzle from the air supply line 44. While many different types of nozzles are suitable for use with the present invention, the preferred embodiment is the nozzle 36' shown in FIG. 4. The nozzle 36' includes a central bore 80 for receiving the fluid from the fluid supply hose 40 and a plurality of circumferentially arranged atomizing air supply channels 82 for receiving atomizing air from the hose 44 and for directing the flow of air to the outlet of the central bore 80. The flow of air past the outlet of the central bore 80 creates a low pressure zone which induces, or draws, fluid from the hose 40 through the central bore 80 in a conventional manner and causes the fluid to be mixed with and atomized by the air before passing into the inlet 38 of the intake manifold 14. In the alternative, a nozzle 36" of the type shown in FIG. 5 may be provided which includes a central bore 84 connected to the fluid supply hose 40 and an air injection channel 86 connected to the air supply hose 44. The air injection channel 86 opens into the central bore 84 at an acute angle to effect the desired induction and atomizing functions.

Electronic control circuitry suitable for effecting the desired control of the motor 50 and the connected air pump 48 are shown in FIGS. 6 and 7 and designated by the reference characters 100' and 200, respectively. FIG. 6 illustrates an electrical circuit 100' of the analog type suitable for use with the analog sensor of FIGS. 2 and 2A, and FIG. 7 illustrates an electronic control circuit 200 of the digital type suitable for use with the digital sensor of FIGS. 2 and 2B.

In FIG. 6, the electronic control circuit includes a differential amplifier 102 having its output connected to a logic gating circuit 104 which, in turn, is connected to the input of a power amplifier 106. The motor 50 (FIG. 1) is connected to the output of the power amplifier 106 and is driven in response to that output. In operation, the analog voltage output from the fluid flow sensors S1 and S2 are applied to the two inputs of the differential amplifier 102 which provides an output that is proportional to the difference between its inputs (and, of course, proportional to the fuel flow to the engine). The overall gain of the differential amplifier 102 is controlled in a conventional manner through a gain input and may be further controlled in a selected manner by the output of a pre-ignition or knock sensor which serves to increase the differential amplifier 102 gain a selected amount when pre-ignition and/or knock conditions are present in a spark-ignition engine or when knocking in a compression-ignition engine exceeds a predetermined threshold. Pre-ignition or knock sensors are typically fabricated from piezo-electric devices and are responsive to vibrational and shock waves caused by pre-ignition and knock. The output of the differential amplifier 102 is provided to a logic control gate 104 which also receives, as inputs, the output of an engine temperature sensor and a throttle position sensor (not shown). The logic control gate 104 serves to cut-off the output of the differential amplifier 102 when the engine operates below a selected temperature (viz., during cold start and warm-up) or when the engine throttle position indicates that the engine is operating below a selected load or output level, for example, when the vehicle is de-accelerating, since fluid injection in these engine operating regions is usually not desired. The output of the logic gate 104 is provided to the power amplifier 106 which in turn is connected to and directly provides drive power to the motor 50. Accordingly, when the engine is consuming a relative small quantity of fuel, that is, when the engine is operating under a light load, the difference in the output between the fuel flow sensors S1 and S2 will be relatively small and the power output from the amplifier 106 delivered to the drive motor 50 will likewise be small so that the quantity of atomizing air provided through the nozzle 36 and the concomitant flow of fluid from the reservoir 72 will be relatively small. Conversely, when fuel consumption increases in response to engine load demands, for example, when driving a heavily loaded vehicle up a hill, the difference in output between the fuel sensors S1 and S2 will proportionally increase to thereby increase the power applied to the motor 50, the air flow rate through the nozzle 36, and the concomitant injection of fluid from the container 72 in the engine. As can be appreciated, the system is proportional in that as the engine demands for fuel increase and decrease, the concomitant injection of fluid into the intake air of the engine will likewise increase or decrease.

In FIG. 7, the digital embodiment of the electronic control circuit 200 includes first and second counters 202 and 204 each having respective serial inputs connected to the output of their respective fluid flow sensor pick-offs 66 (FIG. 2B), and a comparator 206 having its parallel input ports connected to the parallel outputs of the first and second counters 202 and 204. A clock 208 provides a recurring pulse output to the input of a recycling sample-period counter 210 that provides a control output to the first and second counters 202 and 204 and the comparator 206. The output of the comparator 206, which is a binary number the magnitude of which is representative of the fuel being consumed by the engine during each sample period, is provided to a digital-to-analog (D/A) converter 212 which converts the digital output from the comparator 206 to a proportional analog signal that is applied to the power amplifier 214. The motor 50 (FIG. 1) is connected to the output of the power amplifier 214 and is driven in response to that output. The amplifier 214 also receives, as control inputs, the output of an engine temperature sensor, throttle position sensor, and pre-ignition or knock sensor. In operation, the sample period counter 210 resets the counters 202 and 204 and the comparator 206 at the end of each recurring sample period. During each sample period, the counters 202 and 204 count the pulses from their respective sensors with the difference determined by the comparator 206. At the end of each sample period, the comparator 206 contents are latched and gated to the digital-to-analog converter 212 which provides a proportional output to the amplifier 214. Other inputs provided to the amplifier are, for example, engine temperature and throttle position signals that inhibit amplifier 214 operation at low temperature (viz. cold start and warm-up) and no or low load conditions (idle and deceleration). The input from the pre-ignition or knock sensor can be used to increase amplifier 214 gain a selected amount when pre-ignition or knock is detected in a spark-ignition engine or when the knock in a compression-ignition engine increases beyond a predetermined limit. As can be appreciated, the output from the amplifier 214 is proportional in nature, that is, as fuel consumed by the engine increases or decreases, the power applied to the motor 50 will increase or decrease to control the air flow rate through the nozzle 36 and the concomitant flow of fluid from the reservoir 72 through nozzle 36.

The fluid injection system of the present invention provides for the desired injection of the combustion enhancing fluid into the intake air in a manner that is responsive to and generally proportional to the fuel consumption by the engine. Accordingly, the combustion enhancing fluid is provided to the engine in a manner that is responsive to the engine's needs for all operating engine conditions include idle, acceleration, and various loads at constant throttle operation. The various inputs to the electronic control circuit inhibit operation of the system during cold starting and warm-up, and the throttle position sensor (as well as other types of sensors including engine manifold vacuum sensors) serve to provide signal inputs that prevent or modify the operation of the fluid injection system during the engine de-acceleration, for example, when the vehicle is coasting downhill.

The fuel consumption arrangement disclosed, that is, measurement of the delivered and returned fuel flow rates with transducers and a determination of the difference is exemplary. Other fuel measurement arrangements can include direct measurement of the pulse width in those electronic fuel injection systems in which the fuel injectors are actuated by pulses of varying width. The directly measured pulses are then integrated over a period of time or otherwise summed to provide an indication that is representative of the fuel consumed by the engine.

The pump/motor combination described is exemplary; other device combinations are suitable provided they supply a flow of air in a manner that is proportional to their electrical control input. For example, the motor 50 can be of the digitally driven stepping motor type, or the pump/motor combination can be a diaphragm type pump driven by a reciprocating electro-motor.

While the preferred embodiment of the fluid injection system of the present invention has been shown in combination with the schematically represented head assembly of FIG. 1, it will be readily apparent to those skilled in the art, the fluid injection system can be applied to any one of a plurality of different types of engines including four-cyclinder, six-cylinder, and eight-cylinder engines of either the in-line, opposed "V," or radial configuration. Also the present invention is not limited to use with engines having a fuel injection arrangement but is also suitable for use with engines of the carburetor type in which appropriate fuel consumption measurement devices are used. Also, references to the term combustion enhancing fluid, water, and water enhancing solution, as used herein includes other types of fluids that can be injected into an engine to affect the combustion process, such as octane improvers in gasoline engines, cetane additives in diesel oil engines, antidetonates, oxygen additives, etc.

As will be apparent to those skilled in the art, still other changes and modifications may be made to the fluid injection system of the present invention without departing from the spirit and scope of the invention as recited in the appended claims and their legal equivalent.

What is claimed is:

1. A system for injecting a fluid into the intake air of an internal combustion engine of the type having both means for providing intake air and means for providing fuel from a fuel supply means to a combustion chamber, said system comprising:

first means for injecting a fluid into said intake air in response to a flow of supply air provided to said first means;

an air pump connected to a controllable electric drive means, said air pump providing a flow of supply air to said first means in response to said controlled electric drive means to cause said first means to inject the fluid into said intake air; and third means connected to said drive means for effecting control thereover to vary the flow of supply air to said first means, said third means connected to the fuel supply means and operative to control said drive means to provide a flow of supply air to said first means that is responsive to the fuel flow provided by the fuel supply means.

2. The system claimed in claim 1 wherein:

said third means controls said second means so that the flow of supply air is proportional to the fuel provided by the fuel supply means.

3. The system claimed in claim 1 wherein said first means comprises:

a nozzle connected to a source of fluid to be injected and connected to said second means for receiving a flow of supply air therefrom, said nozzle positioned to introduce the fluid into the intake air in response to the flow of supply air from said second means.

4. The system claimed in claim 3 wherein said internal combustion engine further comprises:

an intake manifold for providing intake air to said combustion chamber, said nozzle positioned for introducing the fluid into an inlet air opening of said intake manifold.

5. The system claimed in claim 1 wherein said air pump is a rotary air pump and said electric drive means is an electric motor having a rotatably mounted armature coupled to said rotary air pump, the flow of supply air proportional to the speed of rotation of said electric motor.

6. The system claimed in claim 1 wherein said third means comprises:

fuel flow sensor means and measurement means connected to the means for providing fuel to the combustion chamber to measure the fuel consumed by the engine for controlling said second means to vary the flow of supply air to said first means in response to the flow of fuel to the engine.

7. The system claimed in claim 1 wherein;

said means for providing fuel to the combustion chamber includes a fuel injection means, a fuel delivery line for delivering fuel to said fuel injection means from the fuel supply means, and a fuel return line for returning excess fuel from said fuel injection means to the fuel supply means;

first fuel sensor means connected to said fuel delivery line for measuring the fuel flow therethrough;

second fuel flow sensor means connected to said return line for measuring the flow of fuel therethrough; and electronic means connected to said first and second fuel flow sensor for determining the difference in fuel flow therebetween to provide an output signal to said second means.

8. The system claimed in claim 7 wherein said fuel flow sensor comprises:

at least one rotatably mounted impeller wheel, the speed of rotation which is responsive to the fuel flow thereacross.

9. The system claimed in claim 7 wherein;

said electronic means is further responsive to a temperature sensor to disable said fluid injection system from operation during cold start and low temperature operation below a predetermined temperature.

10. The system claimed in claim 7 wherein:

said electronic means is further responsive to a throttle position sensor to disable said fluid injection system from operation at throttle positions below a selected position.

11. The system claimed in claim 7 wherein:

said electronic means is further responsive to a vibration sensor to increase the responsiveness of said fluid injection system upon detection of vibration above a predetermined limit.

12. The system claimed in claim 7 wherein said fuel providing means is an electronically controlled fuel injection system.

13. The system claimed in claim 7 wherein said means for delivering fuel to the combustion chamber is a mechanically driven pump for a combustion-ignition engine.

* * * * *